July 30, 1963
V. H. PENFOLD ETAL
3,099,756
CURRENT PULSING CIRCUIT WHICH IS SENSITIVE
TO CURRENT CHANGES
Filed May 6, 1960
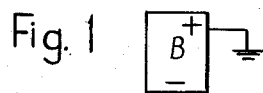
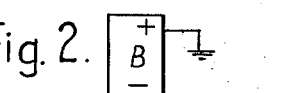
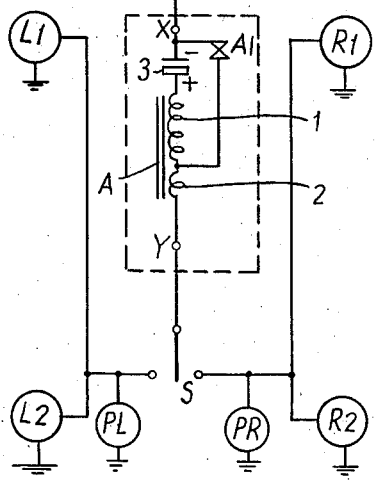
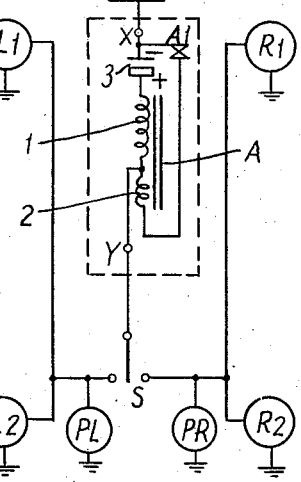
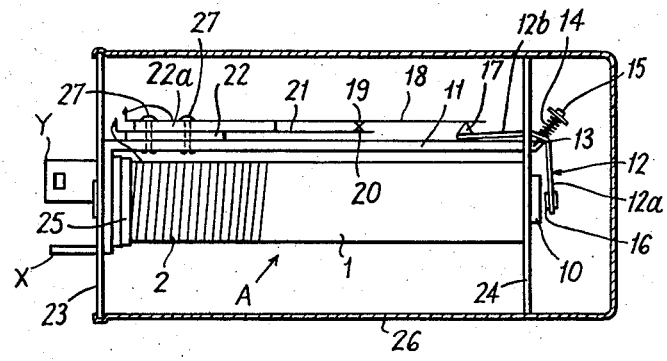
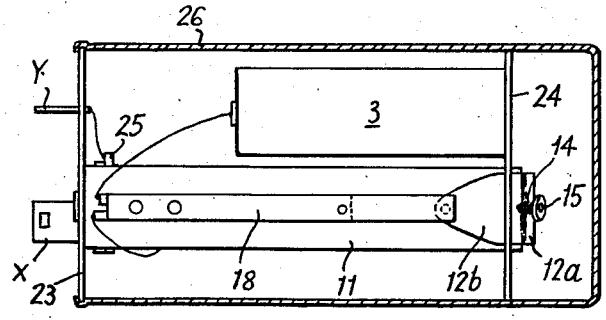
Inventors
V. H. PENFOLD +
R. E. IRELAND
By
Holcombe, Wetherill + Brisbois
Attorneys 3,099,756
CURRENT PULSING CIRCUIT WHICH IS
SENSITIVE TO CURRENT CHANGES
Vincent Hamilton Penfold and Reginald Ernest Ireland, Southwick, England, assignors to William Edward O'Shei, Harlington, England
Filed May 6, 1960, Ser. No. 27,323
Claims priority, application Great Britain May 22, 1959
5 Claims. (Cl. 307—132)

The present invention relates to a current pulsing circuit for periodically interrupting the supply of current to a load, the circuit being sensitive to changes in the current taken by the load. The invention is particularly applicable for use as an automatic switch for controlling the flashing of the lamps of a flashing light direction indicator system on a vehicle in which the indicator lamps on each side of the vehicle are connected in parallel, whereby any variation in the current taken by the load, due for example to the failure of one of the lamps, will produce a variation in the speed of operation of the pulsing circuit or cause it to stop operating, thereby producing a corresponding variation in the operation of the driver's pilot light and giving him an indication that his direction indicators are not working correctly.

The invention consists in a current pulsing circuit comprising a relay having two windings, a starting winding of low resistance and a delay winding of relatively high resistance, and a pair of normally-closed contacts, said contacts being connected in series with the starting winding and a load and a current source, and the delay winding being connected in series with a condenser, said condenser and delay winding being bridged by the relay contacts, wherein the two windings are so wound that the magnetic field produced by discharging the condenser through the delay winding, via the closed relay contacts, will be in opposition to the field produced by the load current flowing through the starting winding. The starting winding is so designed that unless the current taken by the load exceeds a predetermined minimum value, the magnetic field produced by the starting winding will not be sufficient to energise the relay and open the relay contacts.

The pulsing circuit of the invention may be conveniently constructed in the form of a device adapted for connection, preferably by a plug-in fitting, in the load circuit to be pulsed. The invention therefore also consists in a current pulsing device comprising a relay having a starting winding of low resistance and a delay winding of relatively high resistance and a pair of normally closed relay contacts, a condenser, and two terminals for connecting the device in series with the load to be pulsed, wherein the starting winding is connected in series with the relay contacts to form a starting circuit connected between the two terminals, and the delay winding is connected in series with the condenser to form a delay circuit which is shunted across at least that part of the starting circuit which includes the relay contacts, the two windings being so connected that a current discharge from said condenser through the delay winding when the armature contacts are closed causes the delay winding to produce a field in opposition to the field produced by the starting winding by a current in the starting circuit which flows through the relay contacts in the same direction as said discharge current.

In order that the invention may be more clearly understood, reference will now be made to the accompanying drawings, in which:

FIGURE 1 is a circuit diagram of one embodiment of a pulsing circuit according to this invention in which the two windings are wound on the relay in the same direction, the figure also showing a load comprising a flashing light direction indicator system.

FIGURE 2 is a modification of FIGURE 1, in which the two windings are wound in opposite directions on the relay.

FIGURE 3 is a side view of one constructional embodiment of a current pulsing device according to the invention, the casing being shown in section.

FIGURE 4 is a plan view of FIGURE 3, the casing again being shown in section.

Referring to FIGURE 1, the current pulsing circuit according to the invention is indicated by the dotted rectangle and comprises a relay A having a delay winding 1 and a starting winding 2, both wound in the same direction on the relay core and connected in series with an electrolytic condenser 3 between two terminals X and Y. The starting winding has a low resistance such that an unimportant voltage drop occurs thereacross, and the delay winding has a considerably higher resistance so as to regulate the charge and discharge times of condenser 3 to desired values. The normally closed armature contacts A1 are bridged across the condenser 3 and delay winding 1. The terminal X is connected to the negative pole of a battery B and the terminal Y through the load circuit to the positive pole of the battery.

In the embodiment shown the load circuit is indicated as a flashing light vehicle direction indicating system, comprising the lamps R1, R2 connected in parallel and constituting the front and rear signal lamps on the right-hand side of the vehicle and the lamps L1, L2 which are similarly connected in parallel and constitute the front and rear signal lamps on the left-hand side of the vehicle, the selection of the pair of signal lamps to be pulsed being controlled by a changeover switch S which can be moved from a neutral "off" position to either of two "on" positions in which the right and left pairs of signal lamps are alternatively connected in series with the pulsing circuit. PR and PL are two pilot lamps, generally located on the vehicle dashboard, which flash with the flashing of the right and left lamp respectively.

Upon actuating the switch S, for example to the right, battery voltage is applied across the circuit and causes current to flow from the negative pole of the battery B, through the closed relay contact A1, the starting winding 2, the switch S in its righthand position, lamps R1, R2 and PR in parallel to the positive pole of the battery. Due to the winding 2 having a low resistance a heavy current flows and the lamps R1, R2 and PR are illuminated. This heavy current pulse immediately energises the relay A which opens its contacts A1, thus extinguishing the lamps R1, R2 and PR, and removing the short-circuit produced by these contacts across the condenser 3 and delay winding 1. A charging current then flows through the electrolytic condenser 3 and the delay winding 1 in series with the lamps, although the resistance of the circuit is too high to pass sufficient current to light the lamps. The condenser 3 charges through this circuit, the charging current keeping the relay energised and the contacts A1 open until the condenser approaches its fully charged condition and the current has fallen to such a low value that the relay armature falls off and closes the relay contacts A1. This again completes the circuit through A1, the starting winding 2 and the lamps, so that the lamps again light up. Simultaneously, the contacts A1 connect the charged condenser 3 across the delay winding through which it discharges. Since the windings 1 and 2 are wound in the same direction, the polarity of the voltage applied across the delay winding 1 by the condenser 3 produces a magnetic field in opposition to the field produced by the battery current flowing through the starting winding 2, thus delaying the attraction of the relay armature until the condenser has discharged sufficiently to allow the field produced by the starting winding to attract the armature. During this delay period the lamps R1, R2 and PR remain illuminated. At the end of the delay period the contacts A1 open and the cycle repeats as long as the current taken by the load to be pulsed remains unchanged.

If the load is increased or decreased, the frequency rate of the pulsing will change correspondingly, and the circuit is such that when the current in the load is reduced below a predetermined value the field created by the starting winding 2 is insufficient to attract the relay armature so that the load will then remain connected without pulsing. In the case of the flashing indicator system described, the pulsing circuit is so designed that this predetermined value of load current is greater than the current taken by either of the signal lamps R1, R2 separately, plus the current taken by the pilot lamp PR, and is less than the current taken by the two signal lamps R1, R2 operating together in parallel, so that if one of the signal lamps R1, R2 burns out, the pulsing circuit does not start when the switch S is thrown to the right, the pilot lamp PR remaining continuously alight and indicating a fault in the system.

A fault on the left side of the system is similarly indicated by the pilot lamp PL remaining alight without flashing when the switch S is thrown to the left.

It will be seen that the complete functioning of the circuit is obtained with a single pair of relay contacts. The circuit is self-monitoring; the device ceases to operate, or operates at a different speed, if a variation or fault occurs in the load. Sparking at the relay contacts is suppressed by the action of the condenser and the delay winding, thereby achieving long contact life. The initial heavy flux through the starting winding produces a high residual magnetism in the relay core which enables the flux required to be produced by the delay winding in order to hold the armature attracted to be less than would otherwise be the case. Consequently, the current which must flow through the delay winding to hold the armature attracted can be reduced, thereby enabling a smaller, and consequently cheaper, electrolytic condenser to be used. Also the relay core can be made of a mild steel.

FIGURE 2 shows the circuit modifications necessary if the two relay windings are wound in opposite directions on the core. In this case the terminal Y is connected to the junction between the delay winding 1 and the starting winding 2, and the starting winding is connected in series with the relay contacts A1 to form a starting circuit which bridges the condenser 3 and the delay winding 1. The circuit operates exactly as described with reference to FIGURE 1.

A constructional embodiment of a flasher device incorporating the pulsing circuit of this invention is illustrated in FIGURES 3 and 4. The relay A comprises a magnetic core 10, for example of mild steel, around which is wound the delay coil 1, and around that the few turns constituting the low resistance starting coil 2, the magnetic circuit being completed by a magnetic yoke 11, for example of mild steel, the end of the yoke carrying an L-shaped armature 12 which rocks about a knife-edge 13 at the end of the yoke and is held in contact therewith by a spring 14 retained by a screw 15 which passes through an opening in the corner of the armature and screws into the yoke. The limb 12a of the armature which extends in front of the pole of the core 10 carries a thin spacer member 16 of non-magnetic material to prevent the armature from sticking to the pole piece. The other limb 12b of the armature carries a member 17 which is adapted to engage the leaf-spring 18 carrying a contact 19 which normally engages with the contact 20 of a second leaf-spring 21, the leaf spring 21 being spaced from the yoke 11 by a spacer 22 of insulating material and from the spring 18 by an insulating spacer 22a, the springs and the spacers being secured to the yoke 11 by two rivets 27 which pass through clearance holes in the spring 21 so that the latter is insulated from the yoke. The spring 18 normally moves the armature to the position shown in FIGURE 3 with the limb 12a away from the core 10, in which position the contacts 19, 20 (which constitute the contacts A1 in FIGURES 1 and 2) are closed. When the relay is energized, the armature is attracted and moves the spring 18 to open the contacts 19, 20.

At its opposite ends the relay is attached to discs 23, 24 of insulating material. The disc 24 is secured on the core 10 to form an end wall for the coil winding, and is provided with an opening (not shown) which locates the free end of the yoke 11 and allows the armature 12 to pass therethrough. An insulating washer 25 forms the other end wall of the coil. Between the discs 23, 24 is mounted the electrolytic condenser 3 extending alongside of the relay. The disc 23 carries the plug-in terminals X, Y and the circuit connections are completed as indicated in either FIGURE 1 or FIGURE 2 depending upon the relative directions in which the coils 1 and 2 are wound. The device is enclosed by a metal can 26.

In one embodiment of the invention suitable for a vehicle direction indicator system operating on 12 volts in which each of the four signal lamps R1, R2, L1 and L2 consume 21 watts and each of the pilot lamps consumes 3 watts, the delay winding is wound with 5,500 turns of 0.0044" diameter enamelled copper wire and has a resistance of 325 ohms and the starting winding is wound with 32 turns of 0.022" diameter enamelled copper wire and has a resistance of 0.15 ohm. An 18 volt electrolytic condenser having a capacity of 250 microfarads is used.

The flasher device according to this invention switches at a speed which is substantially independent of variations in the ambient temperature. No delicate adjustment is required to make the device operate at a desired speed. Its speed of operation, for a specified current load, is determined by the components in the pulsing circuit and the device can be designed so that the "on" and "off" periods are of substantially equal duration for a specified current load. The number of turns of the starting winding is related to the load, and if desired a tapped starting winding may be provided so that the device can, by connection to the appropriate tapping, produces substantially the same pulsing periods for different loads, e.g. for different numbers of signal lamps. The speed of operation also depends upon the position of the coil 2 on the core, and if desired the position of the starting coil may be adjustable along the core.

Another advantage of the flasher device according to this invention is that the signal lamps flash at full brilliance very quickly after the switch S is thrown. When the switch S is thrown current instantaneously flows through the filaments of the signal lamps, and although this first current pulse is of very brief duration since at this instant the condenser 3 is uncharged and there is no delay in opening the relay contacts A1, it is sufficient to produce a brief flash and to warm up the filaments so that in the next cycle the filaments will flash at full brilliance. The British regulations require that the lamps of a direction indicator should flash at between 60 and 120 times per minute, so assuming that the lamps are flashing at their slowest speed they will be illuminated to full brilliance in approximately 0.5 second after actuating the switch S, and even more quickly if the flasher device is designed to pulse at a higher rate.

A further advantage of the flasher device resides in the fact that the flasher device will operate without burning out, at least for some time, in the event of a short circuit to earth occurring in the indicator system and the full battery voltage being applied across the flasher unit. The flasher unit will then operate at a high speed producing an audible buzz which indicates a fault. With the conventional hot-wire flasher unit, such a short-circuit would quickly burn out the unit, and it is therefore quite usual for a fuse to be included in the circuit to protect the flasher unit. Such a fuse is not necessary with the flasher unit according to this invention.

In the case of a direction indicator system incorporating three signal lamps on each side of the vehicle, the flashing device may be so designed that it will not operate if any one of the signal lamps on the side to which the switch S is thrown is burnt out. Alternatively it may be such that if only one signal lamp on that side has burnt out the device will flash at a lower speed, and that if two signal lamps burn out the device will stop operating.

By reason of the low resistance starting winding being connected in series with the load, the device is self-monitoring, the fact that it operates at the predetermined speed showing that the whole system is in proper working order. The flasher device described is suitable for use irrespective of whether the positive or negative terminal of the battery is connected to earth (chassis). In FIGS. 1 and 2 the positive terminal is connected to earth; for a negative earth the connections to the flasher device are reversed, i.e. the positive pole of the battery is connected to terminal Y and the switch S to terminal X.

While particular embodiments of the invention have been described it will be understood that various modifications may be made without departing from the scope of the invention as defined by the appended claims. For example, the pilot lamps may, if desired, be connected in a separate circuit controlled by a back contact on the spring set actuated by the relay armature. Or a single low-wattage pilot lamp may be connected across the two contacts of the switch S so that when the switch is thrown to one contact the pilot lamp will be connected to earth through the signal lamps connected to the other contact.

We claim:
1. A pulsing device comprising a relay having a starting winding of low resistance and a delay winding of relatively high resistance and a pair of normally closed relay contacts, a condenser, and two terminals for connecting the device in series with the load to be pulsed, wherein the starting winding is connected in series with the relay contacts to form a starting circuit connected between the two terminals, and the delay winding is connected in series with the condenser to form a delay circuit which is shunted across at least that part of the starting circuit which includes the relay contacts, the two windings being so connected that a current discharge from said condenser through the delay winding, when the armature contacts are closed, causes the delay winding to produce a field in opposition to the field produced by the starting winding by a current in the starting circuit which flows through the relay contacts in the same direction as said discharge current.

2. Device as claimed in claim 1, wherein the two windings are wound in the same direction and are connected in series with one another and the condenser between the two terminals, the relay contacts being connected between the junction between the two windings and the side of the condenser remote from said junction.

3. Device as claimed in claim 1, wherein the relay has a magnetic core on which is wound the delay winding and the starting winding, the return magnetic path being completed by a magnetic yoke on the end of which is rockably mounted an armature, the yoke also carrying two mutually insulated leaf springs each carrying contacts which are normally urged by the leaf springs to close together, one of said leaf springs resiliently urging the armature normally to rock away from the core and being moved by the armature, when attracted by the core, to open said contacts.

4. Device as claimed in claim 3, wherein the relay is assembled with an electrolytic condenser to form a unit which is provided with terminals for connecting the device in circuit with the load to be pulsed.

5. Device as claimed in claim 3, wherein the windings are wound in opposite directions on the core, the condenser and delay winding being connected in series between said two terminals, the starting winding being connected between one of the terminals and one of the leaf springs, and the other leaf spring being connected to the other terminal.

References Cited in the file of this patent
UNITED STATES PATENTS

| | | |
|---|---|---|
| 1,811,858 | Miller | June 30, 1931 |
| 1,902,799 | Day | Mar. 21, 1932 |
| 2,128,800 | Chinskey | Aug. 30, 1938 |
| 2,810,841 | Berch | Oct. 22, 1957 |
| 2,878,431 | Hull | Mar. 17, 1959 |

FOREIGN PATENTS

| | | |
|---|---|---|
| 848,441 | Great Britain | Sept. 14, 1960 |